United States Patent
Nada et al.

(10) Patent No.: US 10,620,740 B2
(45) Date of Patent: Apr. 14, 2020

(54) BIOMETRIC AUTHENTICATION SYSTEM AND METHOD

(71) Applicant: FUJITSU LIMITED, Kawasaki-shi, Kanagawa (JP)

(72) Inventors: Hajime Nada, Kawasaki (JP); Yukihiro Abiko, Kawasaki (JP); Soichi Hama, Atsugi (JP); Satoshi Maeda, Atsugi (JP); Satoshi Semba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 15/205,091

(22) Filed: Jul. 8, 2016

(65) Prior Publication Data
US 2017/0083144 A1    Mar. 23, 2017

(30) Foreign Application Priority Data

Sep. 18, 2015  (JP) .................................. 2015-184662

(51) Int. Cl.
*G06F 3/041* (2006.01)
*G06F 3/00* (2006.01)
*G06K 9/00* (2006.01)

(52) U.S. Cl.
CPC ............ *G06F 3/0416* (2013.01); *G06F 3/005* (2013.01); *G06F 3/0414* (2013.01);
(Continued)

(58) Field of Classification Search
CPC ...... G06F 3/005; G06F 3/0414; G06F 3/0416; G06K 9/00013; G06K 9/00026; G06K 9/00033; G06K 9/00912
See application file for complete search history.

(56) References Cited

U.S. PATENT DOCUMENTS

| 2005/0100200 A1 | 5/2005 | Abiko et al. |
| 2008/0092245 A1* | 4/2008 | Alward ................. G06F 21/316 726/28 |

(Continued)

FOREIGN PATENT DOCUMENTS

| EP | 2 797 091 A1 | 10/2014 |
| EP | 2797019 A1 * | 10/2014 ......... G06K 9/00006 |

(Continued)

OTHER PUBLICATIONS

Chitra Doral et al. "Distortion Detection in Fingerprint Videos" In: "Automatic Fingerprint Recognition Systems," Dec. 1, 2003, 5 pages.*

(Continued)

*Primary Examiner* — LaTanya Bibbins
(74) *Attorney, Agent, or Firm* — Xsensus LLP

(57) ABSTRACT

A method includes acquiring, from a touch panel, a contact position of a manipulating body and contact information that indicates a degree to which the manipulating body is in contact at the contact position, acquiring, from a camera, a plurality of images captured while the manipulating body is in contact with a plurality of mutually different positions on the touch panel due to manipulations with the manipulating body, creating variation information that indicates a variation in contact information, according to a plurality of contact information corresponding to the plurality of contact positions, and deciding, according to the variation information, suitability of the plurality of images in the biometric authentication to be executed using the plurality of images.

14 Claims, 18 Drawing Sheets

(52) U.S. Cl.
   CPC ..... *G06K 9/00013* (2013.01); *G06K 9/00026* (2013.01); *G06K 9/00033* (2013.01); *G06K 9/00912* (2013.01)

(56) References Cited

U.S. PATENT DOCUMENTS

| | | | | |
|---|---|---|---|---|
| 2012/0252410 | A1* | 10/2012 | Williams | G06F 21/36 455/411 |
| 2014/0347479 | A1* | 11/2014 | Givon | G06K 9/00342 348/143 |
| 2015/0020181 | A1 | 1/2015 | Iwata | |
| 2015/0043792 | A1 | 2/2015 | Nada et al. | |
| 2016/0350580 | A1* | 12/2016 | Pyun | G06K 9/00073 |

FOREIGN PATENT DOCUMENTS

| | | |
|---|---|---|
| EP | 2 848 196 A1 | 3/2015 |
| JP | 2007-122164 A | 5/2007 |
| JP | 2012-84005 | 4/2012 |
| JP | 5509459 | 6/2014 |
| JP | 2015-26228 | 2/2015 |
| WO | WO 2004/026139 A1 | 4/2004 |
| WO | WO 2013/136553 A1 | 9/2013 |

OTHER PUBLICATIONS

Chitra Dorai, et al. "Distortion Detection in Fingerprint Videos" in: "Automatic Fingerprint Recognition Systems", Dec. 1, 2003, XP055339226, 5 pages.

David D. Zhang "Palmprint Authentication", Springer, 2004, 7 pages.

\* cited by examiner

FIG. 6

| CONTACT POSITION | CONTACT INFORMATION (CONTACT RANGE) | CONTACT INFORMATION (CONTACT PRESSURE) |
|---|---|---|
| (X1,Y1) | X11~X12<br>Y11~Y12 | P1 |
| (X2,Y2) | X21~X22<br>Y21~Y22 | P2 |
| ... | ... | ... |
| (Xn,Yn) | Xn1~Xn2<br>Yn1~Yn2 | Pn |

FIG. 7

| CONTACT POSITION | IMAGE DATA |
|---|---|
| (X1,Y1) | Image 1 |
| (X2,Y2) | Image 2 |
| ... | ... |
| (Xn,Yn) | Image n |

FIG. 8

| THRESHOLD |
|---|
| Th |

FIG. 10

| TEST SUBJECT ID | NUMBER OF TIMES | CONTACT POSITION 1 | IMAGE 1 | CONTACT INFORMATION 1 | ... | CONTACT POSITION n | IMAGE n | CONTACT INFORMATION n |
|---|---|---|---|---|---|---|---|---|
| 0001 | 1 | (X111,Y111) | V111 | T111 | ... | (X11n,Y11n) | V11n | T11n |
| 0001 | 2 | (X121,Y121) | V121 | T121 | ... | (X12n,Y12n) | V12n | T12n |
| 0001 | 3 | (X131,Y131) | V131 | T131 | ... | (X21n,Y21n) | V13n | T13n |
| ... | | ... | ... | ... | ... | ... | ... | ... |

FIG. 12

| CONTACT POSITION | REGISTERED INFORMATION |
|---|---|
| (X1,Y1) | F1 |
| (X2,Y2) | F2 |
| ... | ... |
| (Xn,Yn) | F3 |

FIG. 13

| COMMAND INFORMATION |
|---|
| PLEASE DRAW Z WHILE MOVING THE WHOLE HAND WITHOUT BENDING THE FINGER. |

FIG. 18

| USER ID | CONTACT POSITION 1 | REGISTERED INFORMATION 1 | ... | CONTACT POSITION n | REGISTERED INFORMATION n |
|---|---|---|---|---|---|
| 0001 | (X11,Y11) | F11 | ... | (X1n,Y1n) | F1n |
| 0002 | (X21,Y11) | F21 |  | (X2n,Y2n) | F2n |

BIOMETRIC AUTHENTICATION SYSTEM AND METHOD

CROSS-REFERENCE TO RELATED APPLICATION

This application is based upon and claims the benefit of priority of the prior Japanese Patent Application No. 2015-184662, filed on Sep. 18, 2015, the entire contents of which are incorporated herein by reference.

FIELD

The embodiment discussed herein is related to a biometric authentication technology.

BACKGROUND

A biometric authentication that uses various types of biometric information is known. Biometric information is, for example, information about a palm print, which is wrinkles on the surface of a palm, information about veins in the palm, information about a palm shape such as the width of the palm, the lengths of fingers, and the shape of the outline of a hand, information about fingerprints, and information about an iris. In Non-patent Literature 1 (David D. Zhang "Palmprint Authentication", Springer, 2004), for example, a technology of palm authentication is disclosed that uses biometric information extracted from an image of a palm.

A communication device in which a biometric authentication function is mounted has also been developed in recent years. In Patent Literature 1 (Japanese Patent No. 5509459), for example, a mobile terminal is disclosed that extracts biometric information such as a vein pattern and a palm print shape from image data and uses the biometric information to perform authentication. A camera mounted in the mobile terminal captures the image data.

SUMMARY

According to an aspect of the invention, a method includes acquiring, from a touch panel, a contact position of a manipulating body and contact information that indicates a degree to which the manipulating body is in contact at the contact position, acquiring, from a camera, a plurality of images captured while the manipulating body is in contact with a plurality of mutually different positions on the touch panel due to manipulations with the manipulating body, creating variation information that indicates a variation in contact information, according to a plurality of contact information corresponding to the plurality of contact positions, and deciding, according to the variation information, suitability of the plurality of images in the biometric authentication to be executed using the plurality of images.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an example of the data structure of a contact information storage unit.

FIG. 7 is an example of the data structure of an image information storage unit.

FIG. 8 is an example of the data structure of threshold information.

FIG. 10 is an example of the data structure of a learning data storage unit.

FIG. 12 is an example of the data structure of a registered information storage unit.

FIG. 13 is an example of the data structure of a command information storage unit.

FIG. 18 is a modification of the data structure of the registered information storage unit.

DESCRIPTION OF EMBODIMENTS

Figure 1:
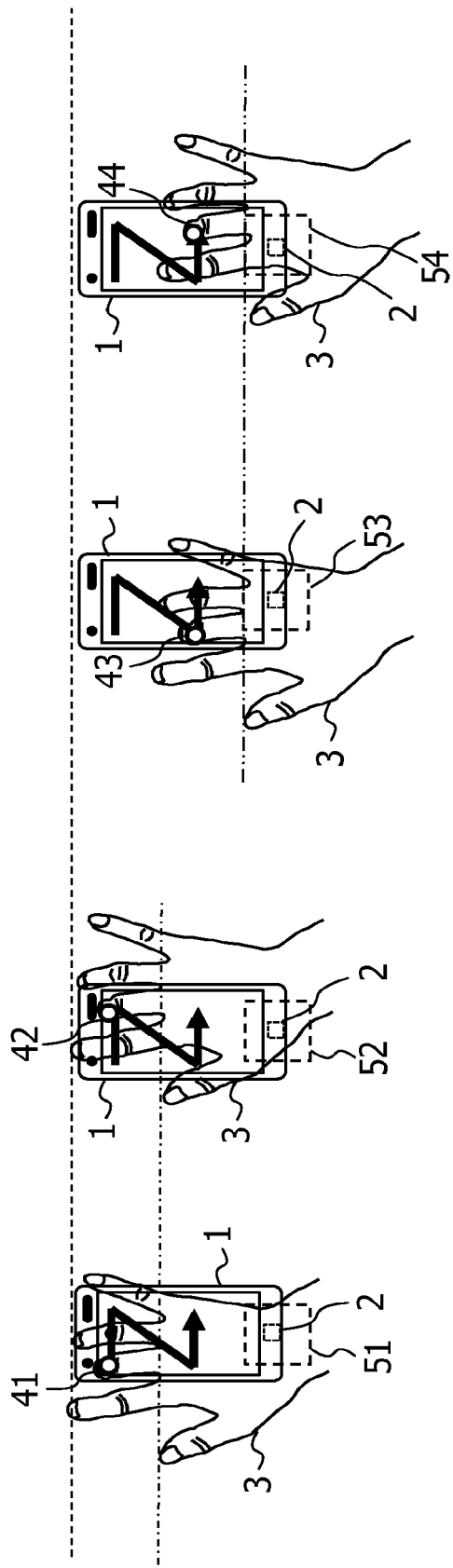
FIGS. 1A, 1B, 1C, and 1D are drawings illustrating manipulations by a user to capture a plurality of images of various portions on a palm.

When biometric authentication is performed by using the above mobile terminal, the user is expected to fix a palm in the air and keep the palm away from the camera to a certain extent so that a camera mounted in the mobile terminal can photograph a wide range of a palm. In this case, it is difficult for the user to take the same posture each time the palm is photographed. For example, the posture at the time of authentication may differ from the posture at the time of registering biometric information about the user. In this case, the ratio of the authentication of the registered user is lowered. The posture is, for example, the orientation of the palm with respect to the camera, a distance between the camera and the palm, and the like.

In view of this, it may be thought that the user is guided so that the posture becomes substantially the same. Specifically, the posture can be controlled so as to be substantially the same by causing the user to bring a particular finger into contact with a touch panel that the mobile terminal or the like has, when compared with a case in which the palm is fixed in the air.

When a particular finger is brought into contact with the touch panel, however, a distance between the camera and the palm is shortened, so only part of the palm is included in the image. In this case, features that can be extracted from part of the palm are lessened when compared with features extracted from a wide range. That is, biometric information created from an image of part of the palm includes information about only less features. Therefore, if biometric information created from an image of part of the palm is used in biometric authentication, authentication precision is lowered when compared with a case in which biometric information created from the whole of the palm. For example, a ratio at which another person is accepted is increased.

Accordingly, an object of the present disclosure is to suppress authentication precision in biometric authentication from being lowered in consideration of changes in posture at the time of capturing images.

Detailed embodiments of the present disclosure will be described below. Each embodiment below can be appropriately combined within a range in which any contradiction does not occur in processing. Each embodiment will be described below according to the drawings.

In an embodiment below, a system (for example, a communication device such as a smart phone or a tablet computer) that has a touch panel display functions as an authentication device that performs palm authentication. Palm authentication is authentication that uses a palm print, which is wrinkles on the surface of a palm, veins in the palm, and a palm shape such as the width of the palm, the lengths of fingers, and the shape of the outline of the hand. That is, biometric information in the description below is information about a palm print, which is wrinkles on the surface of a palm, information about veins in the palm, and information about a palm shape such as the width of the palm, the lengths of fingers, and the shape of the outline of the hand.

Here, as described above, biometric authentication that uses a partial image obtained by photographing only part of a palm has had the problem that authentication precision is lowered. In this embodiment, therefore, a plurality of images are used. Specifically, a camera provided in the system photographs various portions on a palm by having the user execute manipulations to touch a plurality points on the touch panel display with a particular finger. By using a plurality of images that include mutually different parts of the palm, it is suppressed that authentication precision from being lowered.

In the embodiment below, the user is commanded, in advance, to perform predetermined manipulations in which a particular finger of a particular hand is used. For example, the user is commanded to execute a manipulation to draw Z with the middle finger of the right hand. Palm authentication is then performed by using a plurality of images captured during a series of manipulations.

FIGS. 1A, 1B, 1C, and 1D are drawings illustrating manipulations by a user to capture a plurality of images of various portions on a palm. FIGS. 1A to 1D are drawings as viewed from the direction of the back of a hand of the user. That is, a camera 2 confronts the palm and photographs at least part of the palm from the same side as the palm.

The user executes manipulations to draw a particular shape on, for example, the touch panel display of a system 1. In the example in FIGS. 1A to 1D, the user draws the letter Z with the middle finger, starting from the upper left of the touch panel display. A finger used and manipulations on the touch panel display are not limited to those described above.

FIG. 1A illustrates the beginning of a series of manipulations to draw Z on the touch panel display. In FIG. 1A, the middle finger is in contact with a position 41 (upper left) on the touch panel display. The camera 2 mounted in the system 1 photographs a portion 51, which is part of the palm 3 (rear of the back of the hand illustrated in the drawing).

Next, as illustrated in FIG. 1B, the user slides the middle finger horizontally to the right to move the middle finger to a position 42 on the touch panel display. At that time, the camera 2 photographs a portion 52, which is part of the palm 3.

Furthermore, as illustrated in FIG. 1C, the user slides the middle toward the lower left of the touch panel display to move to a position 43 on the touch panel display. At that time, the camera 2 photographs a portion 53, which is part of the palm 3.

Next, as illustrated in FIG. 1D, the user slides the middle finger horizontally to the right to move the middle finger to a position 44 on the touch panel display. At that time, the camera 2 photographs a portion 54, which is part of the palm 3. By this series of manipulations, the user draws Z and the camera 2 captures a plurality of images of mutually different portions on the palm.

Figure 2:
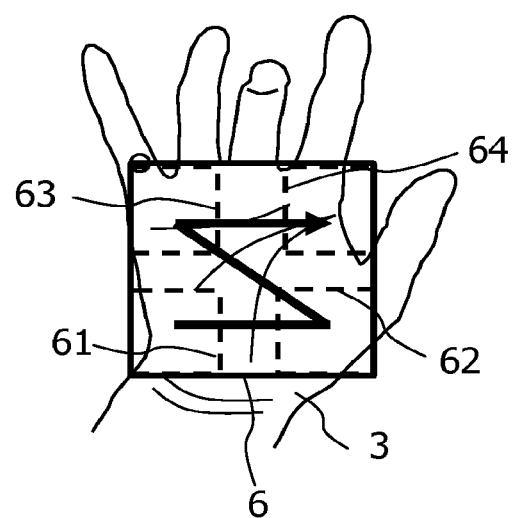
FIG. 2 is a drawing illustrating a range within which the palm is photographed by a series of manipulations illustrated in FIGS. 1A to 1D.

FIG. 2 is a drawing illustrating a range within which the palm is photographed by a series of manipulations illustrated in FIGS. 1A to 1D. A portion 61 in FIG. 2 corresponds to the portion 51 in FIG. 1A. A portion 62 corresponds to the portion 52 in FIG. 1B. A portion 63 corresponds to the portion 53 in FIG. 1C. A portion 64 corresponds to the portion 54 in FIG. 1D.

Although, in FIGS. 1A to 1D, representative four points have been illustrated, the camera 2 captures images of portions on the palm 3 at a predetermined interval between each two drawings as well. Therefore, a range 6 in FIG. 2 is photographed during the series of manipulations.

Since a wide range (range 6) on the palm 3 has been photographed in this way, the use of a plurality of images enables features involved in authentication to be extracted from substantially the whole of the palm 3. A plurality of images are captured by having the user execute predetermined manipulations while a change between a posture at the time of registration and a posture at the time of authentication is reduced by causing the user to touch the touch panel display with a particular finger. Therefore, it is possible to solve the conventional technical problem and suppress authentication precision from being lowered.

The inventor found that since an event described below may occur when a series of manipulations is used, it is desirable to deal with this event.

Next, FIGS. 3A, 3B, 3C, and 3D are drawings illustrating further improvements. The user executes manipulations to draw the letter Z on the touch panel display of the system 1 as in FIGS. 1A to 1D. In FIGS. 3A to 3D, the user draws the letter Z by moving only the middle finger while keeping a substantially fixed positional relationship between the palm 9 and the camera 2, unlike FIGS. 1A to 1D.

Figure 3:
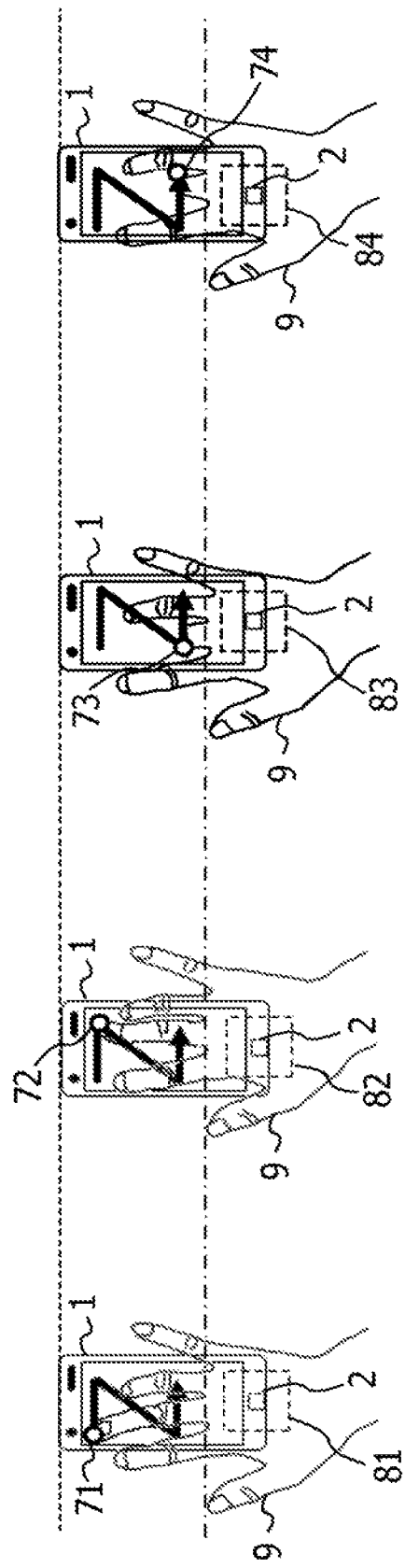
FIGS. 3A, 3B, 3C, and 3D are drawings illustrating further improvements.

In FIG. 3A, the user touches a position 71 on the touch panel display with the middle finger in a state in which the middle finger is shifted to the left side. At that time, the camera 2 photographs a portion 81 on the palm 9. Next, as illustrated in FIG. 3B, the user slides the middle finger horizontally to the right. In this case, the user may move the middle finger to a position 72 on the touch panel display in a state in which the user moves only the middle finger and does not move the palm so much. In this case, the camera 2 photographs a portion 82, which is part of the palm 9.

In addition, as illustrated in FIG. 3C, the user slides the middle finger toward the lower left of the touch panel display. At that time, the user may move the middle finger to a position 73 on the touch panel display by sliding the middle finger to the lower left while bending it in a state in which the user does not move the palm so much. At that time, the camera 2 photographs a portion 83, which is part of the palm 9.

Next, as illustrated in FIG. 3D, the user slides the middle finger horizontally to the right, in which case the user moves the middle finger to a position 74 on the touch panel display by sliding the middle finger to the right while holding the state in which the middle finger is bent. At that time, the camera 2 photographs a portion 84, which is part of the palm 9.

Figure 4:
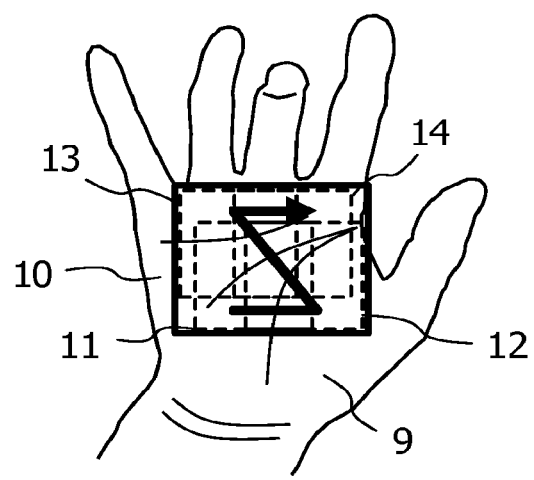
FIG. 4 is a drawing illustrating a range within which the palm is photographed by a series of manipulations illustrated in FIGS. 3A to 3D.

FIG. 4 is a drawing illustrating a range within which the palm is photographed by a series of manipulations illustrated in FIGS. 3A to 3D. A portion 11 in FIG. 4 corresponds to the portion 81 in FIG. 3A. A portion 12 corresponds to the portion 82 in FIG. 3B. A portion 13 corresponds to the portion 83 in FIG. 3C. A portion 14 corresponds to the position 84 in FIG. 3D.

Although, in FIGS. 3A to 3D, representative four points have been illustrated, the camera 2 captures images of portions on the palm 9 at a predetermined interval between each two drawings as well. Therefore, a range 10 in FIG. 4 has been photographed during the series of manipulations.

The range 10 on the palm is narrow when compared with FIG. 2. That is, when predetermined manipulations are performed by moving only a finger as illustrated in FIGS. 3A to 3D, authentication precision is lowered when compared with a case in which predetermined manipulations are performed by moving a finger and the palm together as illustrated in FIGS. 1A to 1D. For example, since only a few features can be extracted from a plurality of images, if biometric information created from the plurality of images is used, the probability of matching biometric information about another person is increased when compared with the case in FIG. 2. When a ratio at which another person is accepted is increased, authentication precision is lowered.

From the above, the inventor noticed that it is desirable to detect an event in which a range, on the palm, that is covered by a plurality of images is narrowed as in a case illustrated in FIGS. 3A to 3D. The embodiment described below improves this point and detects an event as in FIGS. 3A to 3D. By executing palm authentication by the use of a plurality of images captured in a state suitable to authentication, it is suppressed that authentication precision is lowered.

Figure 5:
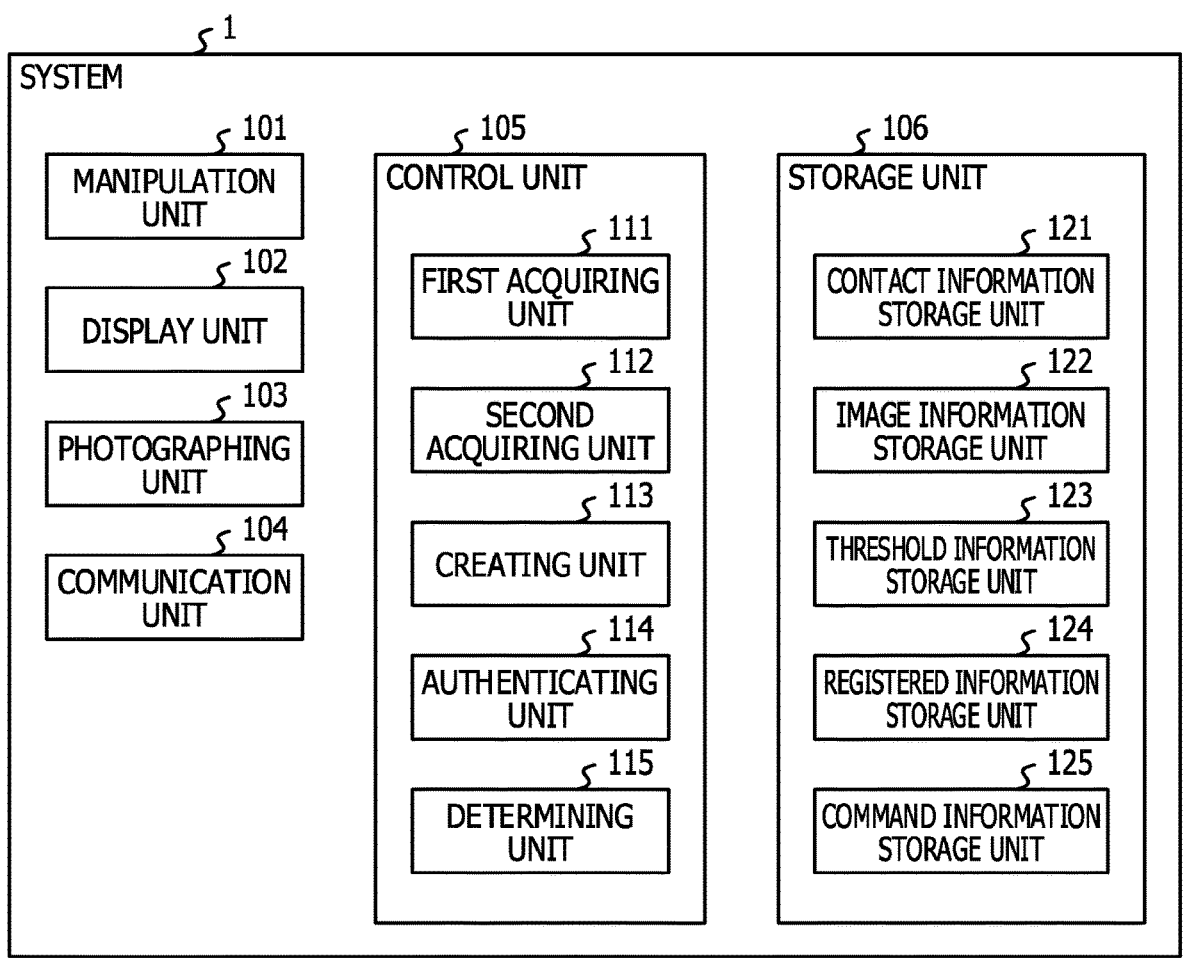
FIG. 5 is a block diagram of a system.

FIG. 5 is a block diagram of a system. The system 1 includes a manipulation unit 101, a display unit 102, a photographing unit 103, a communication unit 104, a control unit 105, and a storage unit 106. The system 1 is, for example, a tablet computer or smart phone. In this embodiment, if biometric authentication succeeds in a state in which the system 1 is locked, the lock is released. Biometric authentication may be executed in another time.

The manipulation unit 101 accepts a manipulation by the user. Specifically, the manipulation unit 101 is implemented by a touch panel. The manipulation unit 101 inputs a contact position at which a finger of the user is in contact and contact information into the control unit 105 at a predetermined time interval. The contact information is information indicating a degree to which the manipulating body (finger) is in contact at the contact position and information indicating a contact state. For example, the contact information is information that includes at least one of a contact range of the finger and a contact pressure at the contact position. The contact information is an example of contact state information.

The display unit 102 displays various types of information. Specifically, the display unit 102 is implemented by a display. For example, the display unit 102 displays command information, which will be described later, and guide information that becomes a guide when the user performs predetermined manipulations (drawing Z, for example). The user slides or moves a finger according to the guide. The manipulation unit 101 and display unit 102 correspond to the touch panel display described above.

The photographing unit 103 captures an image while the manipulating body (finger) is in contact with the manipulation unit 101. Specifically, the photographing unit 103 is implemented by a camera. The photographing unit 103 inputs the captured image (image data) into the control unit 105. The photographing unit 103 captures a plurality of images at a predetermined time interval, starting from a time at which the manipulation unit 101 detected a contact of an object. Times of photography by the photographing unit 103 are controlled by the control unit 105.

The communication unit 104 communicates with another computer through a network. Specifically, the communication unit 104 is an antenna module. For example, the communication unit 104 transmits and receives information to and from another system through a base station.

The control unit 105 controls the whole of the system 1. For example, the control unit 105 is implemented by a processor. The processor is a generic name for hardware circuits such as a central processing unit (CPU) and a micro processing unit (MPU). The control unit 105 further includes a first acquiring unit 111, a second acquiring unit 112, a creating unit 113, an authenticating unit 114, and a determining unit 115.

The first acquiring unit 111 acquires a contact position and contact information from the manipulation unit 101. The first acquiring unit 111 sequentially stores the acquired contact position and contact information in a contact information storage unit 121 in correspondence to each other.

The second acquiring unit 112 acquires a plurality of images captured by the photographing unit 103 while the manipulating body is in contact with a plurality of mutually different positions on the manipulation unit 101 due to manipulations with the manipulating body. That is, the second acquiring unit 112 acquires, from the photographing unit 103, a plurality of images captured by the photographing unit 103 while a finger is in contact with the manipulation unit 101, the plurality of images being obtained by photographing at least part of the palm. The second acquiring unit 112 sequentially stores the acquired plurality of images in an image information storage unit 122.

Although it is desirable that there be a match between an interval of photography by the photographing unit 103 and an interval at which the manipulation unit 101 acquires the contact position and contact information, there may be a slight difference. The second acquiring unit 112 sequentially stores the contact position acquired from the first acquiring unit 111 and the image acquired most recently from the photographing unit 103 in the image information storage unit 122 in correspondence to each other.

The creating unit 113 creates variation information that indicates a variation in contact information, according to a plurality of contact information items, each of which corresponds to one of a plurality of contact positions. Specifically, as variation information, the creating unit 113 creates a variation value that indicates the range of the variation of at least one of the contact range and contact pressure, according to the contact information. The variation value is, for example, a dispersion in a plurality of contact information items, a difference between the maximum value and minimum value of contact information, or a difference between the maximum value and minimum value in a case in which contact positions are included within a predetermined range on the manipulation unit (touch panel display) 101.

In this embodiment, by using a variation value, a distinction is made between a state in which authentication precision is not lowered (desirable state) as illustrated in FIGS.

1A to 1D and a state in which authentication precision may be lowered (undesirable state) as illustrated in FIGS. 3A to 3D.

Specifically, in the case in FIGS. 1A to 1D, since the user moves the middle finger and palm together, the user may not bend or stretch the middle finger during the drawing of Z. From the results of experiments carried out by the inventor, it was found that the area (contact range) of the middle finger's pulp in contact with the touch panel display does not change so much during the processes in FIGS. 1A to 1D. This is also true for the pressure against the touch panel display. As described above, the inventor found that a range over which a finger is in contact with the touch panel display and a pressure by a finger against the touch panel display do not change so much during a series of manipulations in which a finger and the palm are moved together.

In the case illustrated in FIGS. 3A to 3D, however, since the user tries to draw Z by moving only the middle finger, the user is expected to move only the middle finger to the right and left in a restricted state or bend and stretch the middle finger. When shifting from the state in FIG. 3B to the state in FIG. 3C, for example, the user gradually bends the middle finger.

From the results of experiments carried out by the inventor, it was found that the area (contact range) of the middle finger's pulp in contact with the touch panel display in the state in FIG. 3C is smaller than in the state in FIG. 3B. It was also found that the pressure under which the middle finger presses the touch panel display in the state in FIG. 3C, in which the finger is bent, is higher than in the state in FIG. 3B, in which the finger is stretched. As described above, the inventor found that the contact range on the touch panel display and the contact pressure vary during a series of manipulations.

From the above, if a variation in contact information in a series of manipulations is smaller than a threshold, it is inferred that the palm and finger have been moved together as illustrated in FIGS. 1A to 1D. Therefore, it can be inferred that a plurality of images that cover a wide range on the palm have been captured as illustrated in FIG. 2; these images are suitable for registration processing and authentication processing. By contrast, if a variation in contact information is equal to or greater than the threshold, it is inferred that the user has not moved the palm so much and has moved only the finger as illustrated in FIGS. 3A to 3D. Therefore, it can be inferred that a plurality of images that do not cover a wide range on the palm have been captured as illustrated in FIG. 4; these images are not suitable for registration processing or authentication processing.

Therefore, the creating unit 113 decides the suitability of a plurality of images in biometric authentication according to the variation information.

That is, the creating unit 113 decides according to the variation information whether a variation in the contact information is smaller than the threshold. The creating unit 113 is an example of a deciding unit.

Specifically, the creating unit 113 decides whether the variation value is smaller than the threshold. The threshold is a value determined by pre-learning. Details of the threshold will be described later.

If the creating unit 113 decides that the variation in the contact information is smaller than the threshold, the creating unit 113 commands the authenticating unit 114 to execute subsequent processing. In the authenticating unit 114, a plurality of captured images are used in registration processing and authentication processing. If the variation in the contact information is equal to or greater than the threshold, the creating unit 113 commands the determining unit 115 to execute subsequent processing. The plurality of images, which have not input into the authenticating unit 114, are used neither in registration processing nor in authentication processing, and an attempt is made again to capture a plurality of images suitable for authentication.

If the variation is smaller than the threshold according to the variation information, the authenticating unit 114 executes processing to create biometric information about the palm from the plurality of images, the biometric information being used in biometric authentication. The authenticating unit 114 is an example of an executing unit.

For example, if the variation in the contact information is smaller than the threshold, the authenticating unit 114 executes registration processing or authentication processing by using a plurality of images, each of which corresponds to one contact position. In registration processing, for example, the authenticating unit 114 creates biometric information from a plurality of images stored in the image information storage unit 122 and stores the created biometric information in a registered information storage unit 124. In this case, the authenticating unit 114 stores biometric information created from each image in the registered information storage unit 124 in correspondence to the contact position. In the description below, biometric information stored in the registered information storage unit 124 will be referred to as registered information. When biometric information is created from images, a conventional method is used.

In authentication processing, the authenticating unit 114 sequentially acquires images from the image information storage unit 122 and creates biometric information from the acquired images. The authenticating unit 114 then references the registered information storage unit 124 and uses, as a key, a contact position stored in image information storage unit 122 in correspondence to each image to acquire, from the registered information storage unit 124, registered information that has the contact position closest to the contact position used as the key. The authenticating unit 114 sequentially makes a comparison between created biometric information and registered information. The authenticating unit 114 further determines a final authentication result by considering a plurality of comparison results in a comprehensive way.

As described above, if it is inferred from a plurality of images that a wide range on the palm has been photographed, the authenticating unit 114 registers or authenticates biometric information created from the plurality of images. In other words, it is possible to avoid registration or authentication of biometric information created from a plurality of images that would lower authentication precision.

If the variation in the contact information is equal to or greater than the threshold, the determining unit 115 outputs command information to the user, the command information commanding the user to redo predetermined manipulations (photography of the palm). For example, the determining unit 115 references a command information storage unit 125 and causes the display unit 102 to display a specific message. For example, the determining unit 115 causes the display unit 102 to display a message such as "Please draw Z while moving the whole hand rather than moving only the finger". Alternatively, for example, the determining unit 115 may cause a voice output unit (not illustrated) to output a voice message.

The storage unit 106 stores various types of information. The storage unit 106 is implemented by a hard disk drive (HDD), a read-only memory (ROM), a random-access memory (RAM), or their combination. The storage unit 106 has the contact information storage unit 121, the image information storage unit 122, a threshold information storage unit 123, the registered information storage unit 124, and the command information storage unit 125.

The contact information storage unit 121 stores contact positions and contact information in correspondence to each other. Each time the first acquiring unit 111 acquires a contact position and contact information from the manipulation unit 101, the first acquiring unit 111 stores the acquired contact position and contact information in the contact information storage unit 121.

FIG. 6 is an example of the data structure of a contact information storage unit. As illustrated in FIG. 6, the contact information storage unit 121 stores a contact position and contact information acquired at the contact position in correspondence to each other. Although, in the example in FIG. 6, the contact information storage unit 121 stores both a contact range and a contact pressure as contact information, the contact information storage unit 121 may store at least one of them. The contact range is information indicating a range, on the manipulation unit 101, over which a finger is in contact. The contact pressure is information indicating a pressure under which the finger presses the manipulation unit 101. The contact position is a position that typifies the contact range, such as the center of the contact range or its center of gravity.

The image information storage unit 122 stores an image and the contact position of a finger at the photography of the image in correspondence to each other. Each time the second acquiring unit 112 acquires an image, the second acquiring unit 112 stores the acquired image and the contact position of the finger at the capture of the image in the image information storage unit 122 in correspondence to each other.

FIG. 7 is an example of the data structure of an image information storage unit. As illustrated in FIG. 7, the image information storage unit 122 stores a contact position and an image (image data) captured while a finger was in contact with the contact position in correspondence to each other. In the example in FIG. 1A, a contact position indicating the position 41 on the touch panel display and an image of the portion 51 of the palm 3 are stored in correspondence to each other.

Figure 8:
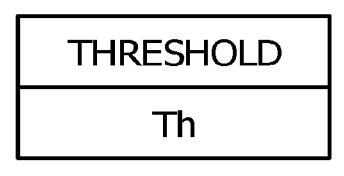

The threshold information storage unit 123 stores information about a threshold referenced by the creating unit 113. FIG. 8 is an example of the data structure of threshold information. If a variation value is equal to or smaller than a threshold Th, it can be inferred that variations in the range of a finger in contact with the touch panel display and pressure are small and the user has executed predetermined manipulations in the states in FIGS. 1A to 1D. The threshold Th may be set for each type of contact information. For example, the threshold Th may be set in a method described later for each of a contact range and a contact pressure.

Now, a method of setting the threshold Th will be described. The threshold Th is a value determined by learning. Another computer other than the system 1 may execute learning. In this embodiment, another computer performs learning by a procedure described below and determines the threshold Th. When the system 1 executes learning processing, the control unit 105 executes processing described below.

First, at a learning stage, each of a plurality of test subjects is caused to execute predetermined manipulations a plurality of times, and a plurality of learning data items are collected for each test subject. Learning data is information acquired while a test subject is performing the predetermined manipulations once; learning data includes a plurality of images captured while the predetermined manipulations are being executed, the contact position of the finger at the capture of each image, and contact information (contact range and contact pressure) at the contact position.

Figure 9:
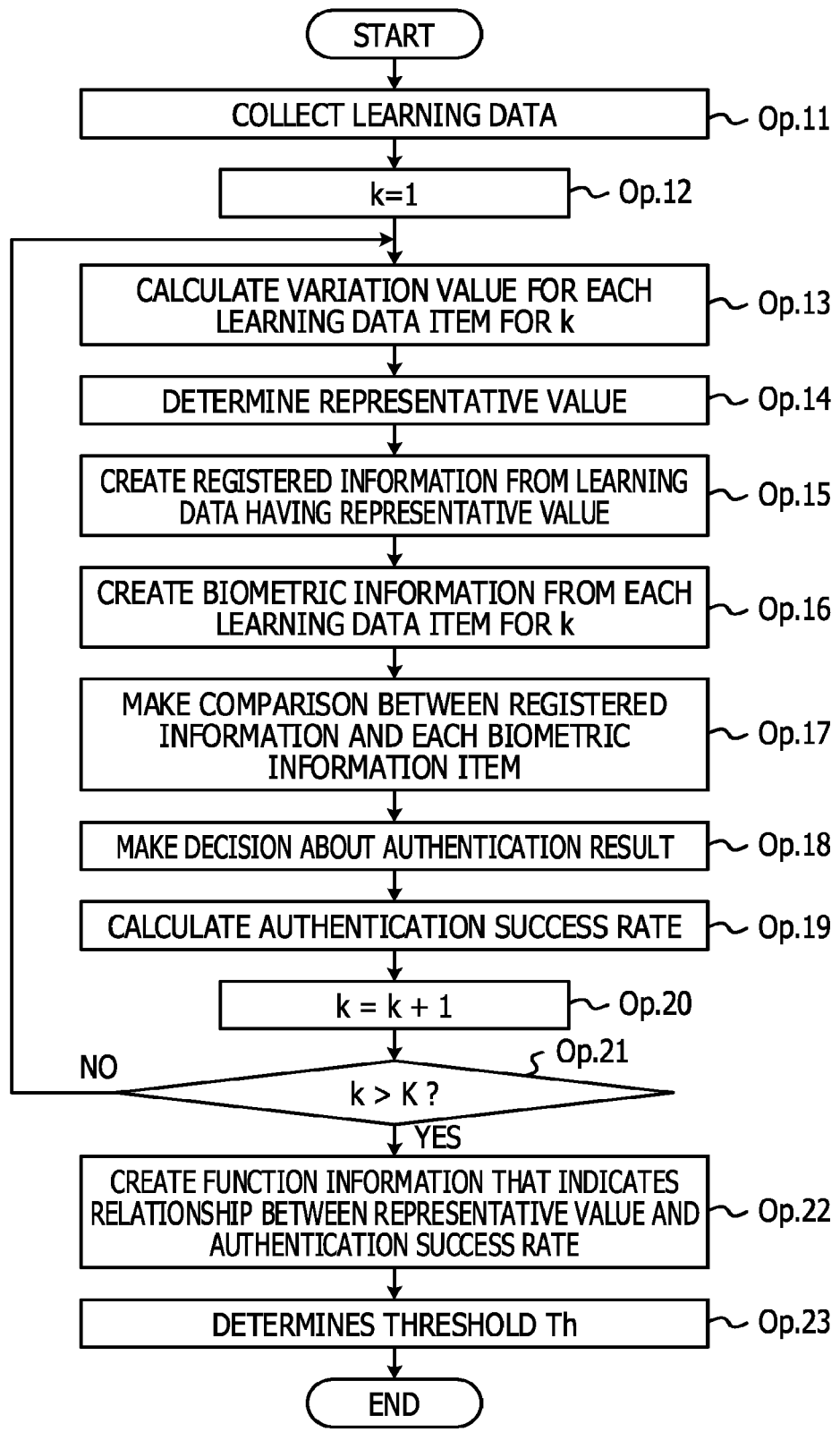
FIG. 9 is a flowchart of learning processing.

FIG. 9 is a flowchart of learning processing. Another computer collects a plurality of learning data items and stores them in a learning data storage unit (Op. 11). Each of the plurality of test subjects executes the predetermined manipulations on the touch panel display with a particular finger of a particular hand a plurality of times. For example, each of the plurality of test subjects executes manipulations to draw Z on the touch panel display with the middle finger of the right hand a plurality of times. While the finger is in contact with the touch panel display, it acquires contact positions and contact information. The camera captures images while the finger is in contact with the touch panel display.

FIG. 10 is an example of the data structure of a learning data storage unit. The learning data storage unit stores a plurality of contact positions, a plurality of images, and a plurality of contact information items for the ID of a test subject and the number of times the predetermined manipulations were executed by the test subject. The example in FIG. 10 indicates an example of learning data collected when a test subject with a test subject ID of 0001 performed the predetermined manipulations three times. Although, in the example in FIG. 10, the number of sets of contact positions, images, and contact information items is n in each learning data, this number may differ in different learning data items, depending on the number of captured images.

For a first manipulation by the test subject with test subject ID 0001, for example, learning data including a total of n sets of contact positions, images, and contact information items, from a contact position ($X111$, $Y111$), an image $V111$, and contact information $T111$ to a contact position ($X11n$, $Y11n$), an image $V11n$, and contact information $T11n$, are stored.

Referring again to FIG. 9, the other computer sets the test subject ID to be processed to an initial value (Op. 12). For example, the other computer sets k, which indicates the test subject ID to be processed, to 1. Next, the other computer calculates a variation value for each learning data item for which the test subject ID is k (Op. 13) according to the contact information. In the example in FIG. 10, there are three learning data items corresponding to test subject ID 0001. Therefore, the other computer calculates a variation value of the contact information from learning data items, from the learning data, corresponding to test subject ID 0001, for which the number of times is 1 to the learning data, corresponding to test subject ID 0001, for which the number of times is 3, for each learning data item. Thus, a plurality of variation values are calculated. A variation value in learning processing is any one of a dispersion in a plurality of contact information items, a difference between the maximum value and minimum value in contact information, a difference between the maximum value and minimum value in contact information when the contact position is within a predetermined range, or any combination of these.

Next, the other computer determines a representative value about a certain test subject ID from a plurality of variation values (Op. 14). For example, the maximum variation value of the plurality of variation values is determined as the representative value. The representative value may be the minimum value or central value.

The other computer identifies learning data that has the representative value as a variation value and creates biometric information by using a plurality of images in the learning data (Op. 15). The created biometric information is used as registered information in authentication processing at the learning stage.

The other computer creates biometric information from each learning data item for which the test subject ID is k, other than the learning data that has been used to create registered information (Op. 16). In the example in FIG. 10, if registered information has been created from, for example, learning data for which the test subject ID is 0001 and the number of times 1, learning data for which the test subject ID is 0001 and the number of times 2 and learning data for which the test subject ID is 0001 and the number of times 3 are targets to be processed. The other computer then creates biometric information from each of a plurality of images in learning data for which the test subject ID is 0001 and the number of times 2 and a plurality of images in learning data for which the test subject ID is 0001 and the number of times 3.

The other computer makes a plurality of comparisons for a particular test subject by making a comparison between registered information and each biometric information item (Op. 17). For example, the other computer calculates a similarity between registered information and biometric information for each contact position. In the example in FIG. 10, a comparison is made for each contact position between registered information derived from learning data for which the test subject ID is 0001 and the number of times 1 and biometric information derived from learning data for which the test subject ID is 0001 and the number of times 2. A comparison is also made for each contact position between registered information derived from learning data for which the test subject ID is 0001 and the number of times 1 and biometric information derived from learning data for which the test subject ID is 0001 and the number of times 3.

Then, the other computer makes a decision about an authentication result from the comparison result (Op. 18). For example, the other computer counts the number of times a similarity calculated for each contact position is equal to or smaller than a similarity threshold; if this number of times is equal to or smaller than an authentication decision threshold, the other computer decides that authentication has succeeded. By contrast, when the other computer counts the number of times a similarity calculated for each contact position is equal to or smaller than a similarity threshold, if this number of times is greater than the authentication decision threshold, the other computer decides that authentication has failed.

An authentication result is obtained for each combination of all learning data taken for the same test subject. That is, authentication result is obtained for each of a combination of learning data for which the test subject ID is 0001 and the number of times 1 and learning data for which the test subject ID is 0001 and the number of times 2 and a combination of learning data for which the test subject ID is 0001 and the number of times 1 and learning data for which the test subject ID is 0001 and the number of times 3.

Next, the other computer calculates an authentication success rate, which indicates a ratio of the number of times authentication has succeeded to the total number of authentications, for a certain test subject (Op. 19). If, for example, the number of times authentication has succeeded for the test subject ID 0001 is 1, the authentication success rate is 50% because the total number of authentications is 2.

Next, the other computer increments k (Op. 20) by one and repeats processing in Op. 13 to Op. 21 until there is no more test subject who is yet to be processed (No in Op. 21).

If processing has been completed for all test subjects (Yes in Op. 21), the other computer creates, for each test subject, function information that indicates a relationship between the representative value and the authentication success rate (Op. 22).

Figure 11:
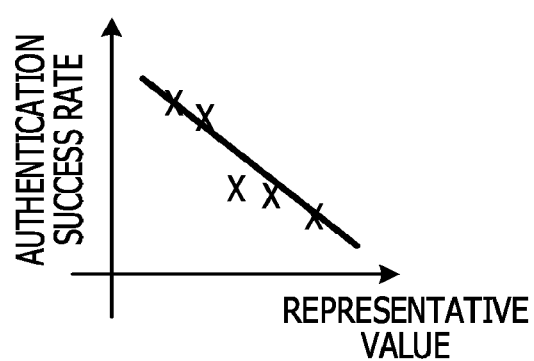
FIG. 11 is a conceptual drawing of function information.

FIG. 11 is a conceptual drawing of function information. As illustrated in FIG. 11, the other computer obtains an approximation function for each test subject by performing linear approximation or polynomial approximation for a distribution with the representative value of variation values plotted on the x axis and the authentication success rate plotted on the y axis. The other computer then creates function information indicating the approximation function.

Then, the other computer determines a representative value, as the threshold Th, at which the authentication success rate is equal to or greater than a predetermined value (Op. 23). The predetermined value is, for example, 80%. The determined threshold Th is input into the system 1 and is stored in the threshold information storage unit 123 under control of the control unit 105.

By comparing the threshold Th obtained by learning and a variation value obtained when an image was actually captured, the creating unit 113 can decide whether the authentication success rate is an adequately high variation value. That is, the creating unit 113 can decide whether a range, on the palm, that is wide enough to assure authentication precision has been photographed.

Referring again to FIG. 5, the registered information storage unit 124 stores the registered information created by the authenticating unit 114 in registration processing. The command information storage unit 125 stores command information that is output by the determining unit 115.

FIG. 12 is an example of the data structure of a registered information storage unit. The registered information storage unit 124 stores contact positions and biometric information in correspondence to each other. When the authenticating unit 114 creates biometric information from an image, the registered information storage unit 124 stores the biometric information and also stores the contact position that has been associated with the image by the image information storage unit 122 together with the biometric information. Registered biometric information is referred to as registered information.

FIG. 13 is an example of the data structure of a command information storage unit. The command information storage unit 125 stores command information that is output when a variation is equal to or greater than the threshold. In the example in FIG. 13, the text "Please draw Z while moving the whole hand without bending the finger" is stored as command information.

Figure 14:
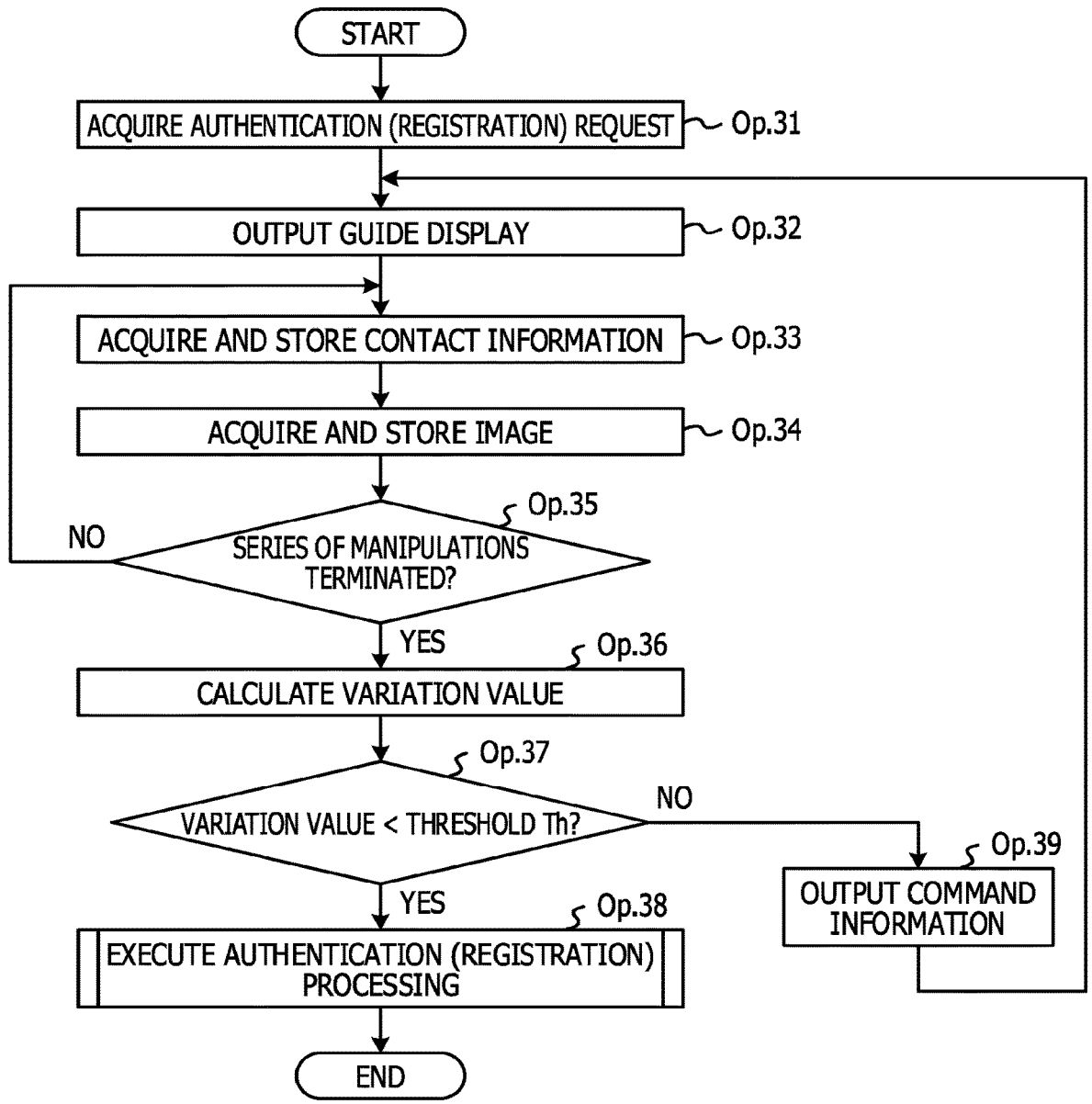
FIG. 14 is a flowchart of authentication (or registration) processing in this embodiment.

Next, a series of processing in this embodiment will be described. FIG. 14 is a flowchart of authentication (or registration) processing in this embodiment.

First, the manipulation unit 101 acquires, from the user, an authentication request that requests authentication processing to be started or a registration request that requests registration processing to be started (Op. 31). The manipulation unit 101 then inputs the request into the control unit 105.

The control unit 105 controls the display unit 102 to output a guide display (Op. 32). For example, the control unit 105 causes the display unit 102 to display a specific shape to be traced by the user with a finger. When the user touches the manipulation unit 101 (touch panel display) with a finger, the manipulation unit 101 creates a contact position and contact information. The first acquiring unit 111 acquires the contact position and contact information created by the manipulation unit 101 and stores the contact position and contact information in the contact information storage unit 121 in correspondence to each other (Op. 33). Furthermore, the first acquiring unit 111 inputs the contact position into the second acquiring unit 112.

Next, when a contact of the finger to the manipulation unit 101 is detected, the control unit 105 controls the photographing unit 103 to cause it to capture an image. The second acquiring unit 112 acquires the image captured by the photographing unit 103 and stores the captured image and the contact position acquired from the first acquiring unit 111 in the image information storage unit 122 in correspondence to each other (Op. 34).

The control unit 105 decides whether a series of manipulations by the user has been terminated (Op. 35). For example, the control unit 105 decides whether the user's finger has been touched each point, on the manipulation unit 101, that corresponds to the shape displayed by the guide display. Alternatively, when touches with the finger have been terminated, the control unit 105 may decide that a series of manipulations has been terminated.

If a series of manipulations has not been terminated (No in Op. 35), the control unit 105 repeats processing in Op. 33 to Op. 35. If a series of manipulations has been terminated (Yes in Op. 35), the creating unit 113 references the contact information storage unit 121 and calculates a variation value in contact information (Op. 36). The creating unit 113 then decides whether the variation value is smaller than the preset threshold Th (Op. 37).

If the variation value is smaller than the preset threshold Th (Yes in Op. 37), the authenticating unit 114 executes authentication processing or registration processing (Op. 38). If the request acquired in Op. 31 is an authentication request, authentication processing is executed. If the request acquired in Op. 31 is a registration request, registration processing is executed. Detailed processing flows of authentication processing and registration processing will be described later.

If the variation value is equal to or greater than the preset threshold Th (No in Op. 37), the determining unit 115 controls the display unit 102 to output command information (Op. 39). Then, processing in Op. 32 and later is repeated. The command information is, for example, text information acquired from the command information storage unit 125.

Figure 15:
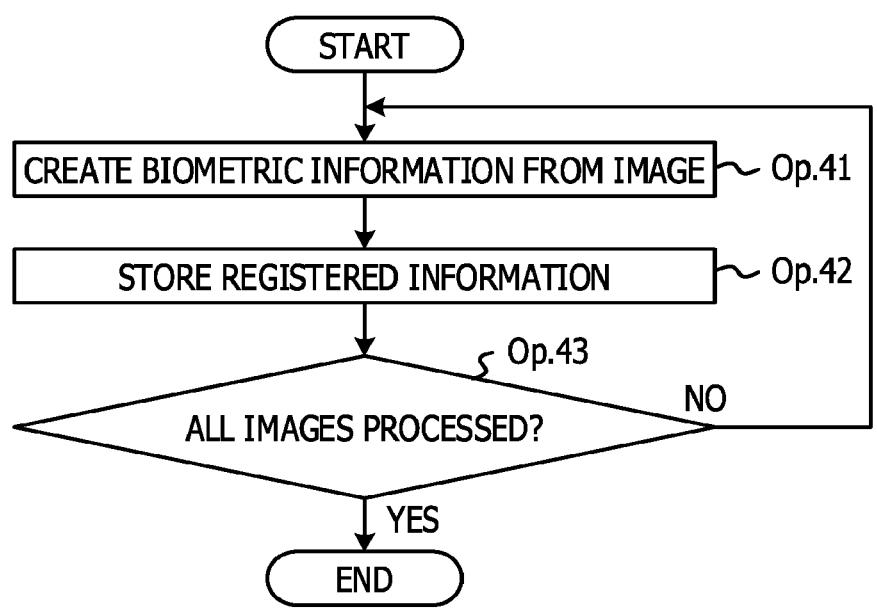
FIG. 15 is a flowchart of registration processing.

FIG. 15 is a flowchart of registration processing. First, the authenticating unit 114 references the image information storage unit 122 and acquires an image to be processed. The authenticating unit 114 then creates (or extracts) biometric information from the image to be processed according to a predetermined algorithm (Op. 41). The predetermined algorithm is, for example, the algorithm disclosed in David D. Zhang "Palmprint Authentication", Springer, 2004 or the like.

Next, the authenticating unit 114 acquires, from the image information storage unit 122, the contact position associated with the image to be processed. The authenticating unit 114 then stores the biometric information created first in the registered information storage unit 124 as registered information, in correspondence to the contact position (Op. 42).

The authenticating unit 114 decides whether processing to create biometric information has been terminated for all images stored in the image information storage unit 122 (Op. 43). If processing to create biometric information has not been terminated for all images (No in Op. 43), the authenticating unit 114 executes processing in Op. 41 and Op. 42 for unprocessed images. If processing to create biometric information has been terminated for all images (Yes in Op. 43), the authenticating unit 114 terminates the registration processing.

Figure 16:
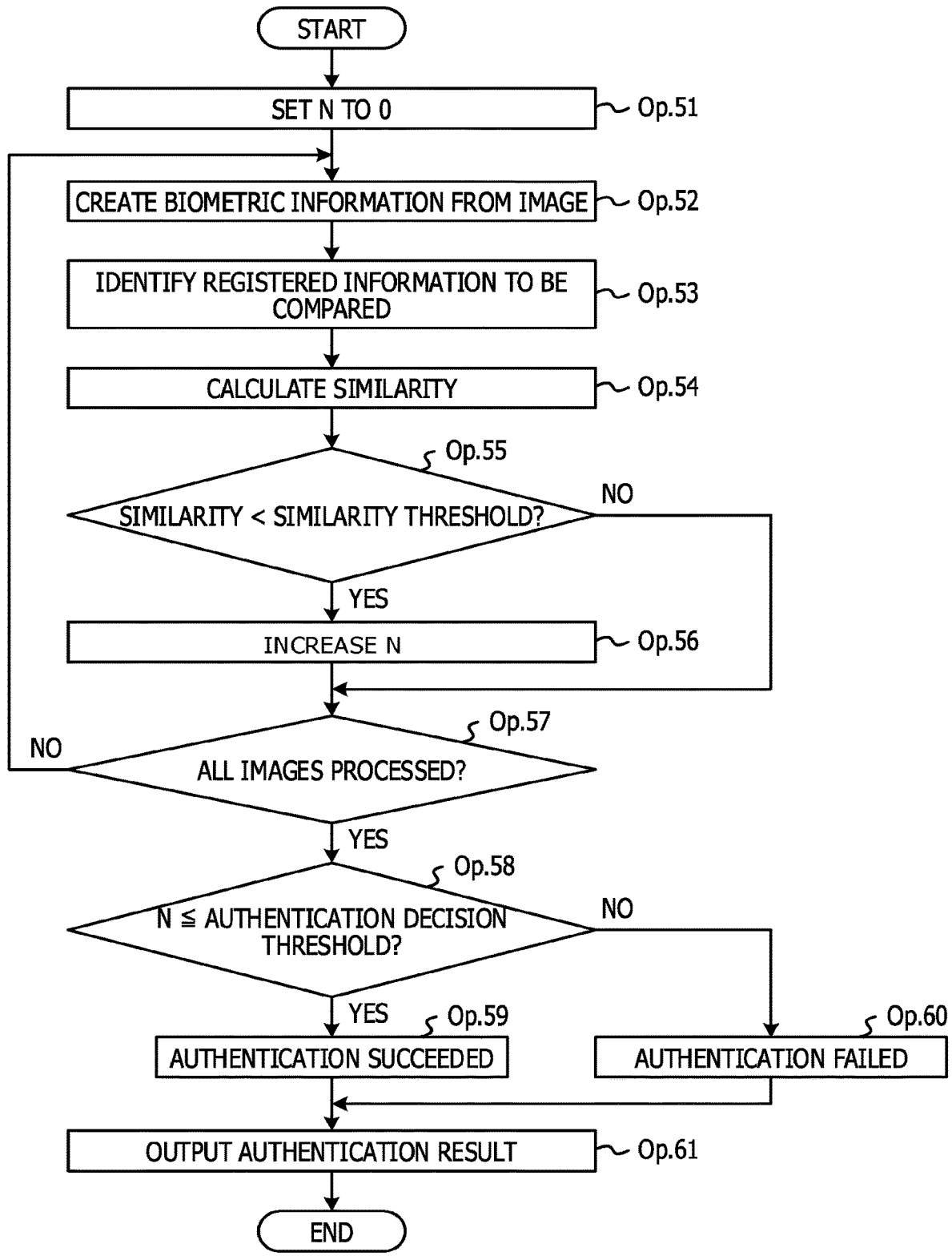
FIG. 16 is a flowchart of authentication processing.

FIG. 16 is a flowchart of authentication processing. The authenticating unit 114 sets N, which indicates the number of times a comparison has failed to 0 (Op. 51). Next, the authenticating unit 114 references the image information storage unit 122 and acquires an image to be processed. The authenticating unit 114 then creates biometric information from the image to be processed according to a predetermined algorithm (Op. 52). The predetermined algorithm is, for example, the algorithm disclosed in David D. Zhang "Palmprint Authentication", Springer, 2004 or the like.

Next, the authenticating unit 114 acquires, from the image information storage unit 122, the contact position associated with the image to be processed. The authenticating unit 114 then references the registered information storage unit 124 and identifies registered information associated with the contact position closest to the acquired contact position, as a target to be compared (Op. 53).

The authenticating unit 114 calculates a similarity by making a comparison between the biometric information created in Op. 52 and the registered information identified in Op. 53 (Op. 54). As the method of calculating a similarity, a method disclosed in, for example, David D. Zhang "Palmprint Authentication", Springer, 2004 is used.

Next, the authenticating unit 114 decides whether the calculated similarity is smaller than a preset similarity threshold (Op. 55). If the similarity is smaller than the similarity threshold (Yes in Op. 55), the authenticating unit 114 increases the count of N (Op. 56). That is, if a feature included in the biometric information and a feature included in the registered information are not similar to each other, it is decided that a comparison has failed, so the authenticating unit 114 increments N, which indicates the number of times a comparison has failed, by one. If the similarity is equal to or greater than the similarity threshold (No in Op. 55), the authenticating unit 114 skips Op. 56.

Next, the authenticating unit 114 decides whether all images stored in the image information storage unit 122 have been processed (Op. 57). If there are unprocessed images (No in Op. 57), the authenticating unit 114 executes processing in Op. 52 to Op. 57 for a new image to be processed.

If all images have been processed (Yes in Op. 57), the authenticating unit 114 decides whether N is equal to or smaller than the authentication decision threshold (Op. 58). If N is equal to or smaller than the authentication decision threshold (Yes in Op. 58), the authenticating unit 114 decides that authentication has succeeded (Op. 59). If N is greater than the authentication decision threshold (No in Op. 58), the authenticating unit 114 decides that authentication has failed (Op. 60). Finally, the authenticating unit 114 controls the display unit 102 to output an authentication result (Op. 61).

As described above, if a variation value is smaller than the threshold Th created in learning processing, this embodiment decides that the range, on the palm, that is covered by a plurality of images is enough to assure authentication precision. Registration processing and authentication processing are executed for the plurality of images that have been decided to be enough to assure authentication precision.

If a variation value is equal to or greater than the threshold Th created in learning processing, the range, on the palm, that is covered by a plurality of images is decided not to be enough to assure authentication precision. Neither registration processing nor authentication processing is executed for the plurality of images that have been decided not to be enough to assure authentication precision. If this decision is made, command information is output to promote acquisition of a plurality of images enough to assure authentication precision.

In this embodiment, therefore, an image is captured in a state in which a finger is in contact with the touch panel display to reduce a variation in a posture and a wide range on a palm is photographed by capturing a plurality of images in states in which the contact position is changed. In addition, variations in contact information are used to decide whether a wide range on the palm has been photographed, so it is possible to suppress authentication precision from being lowered.

Figure 17:
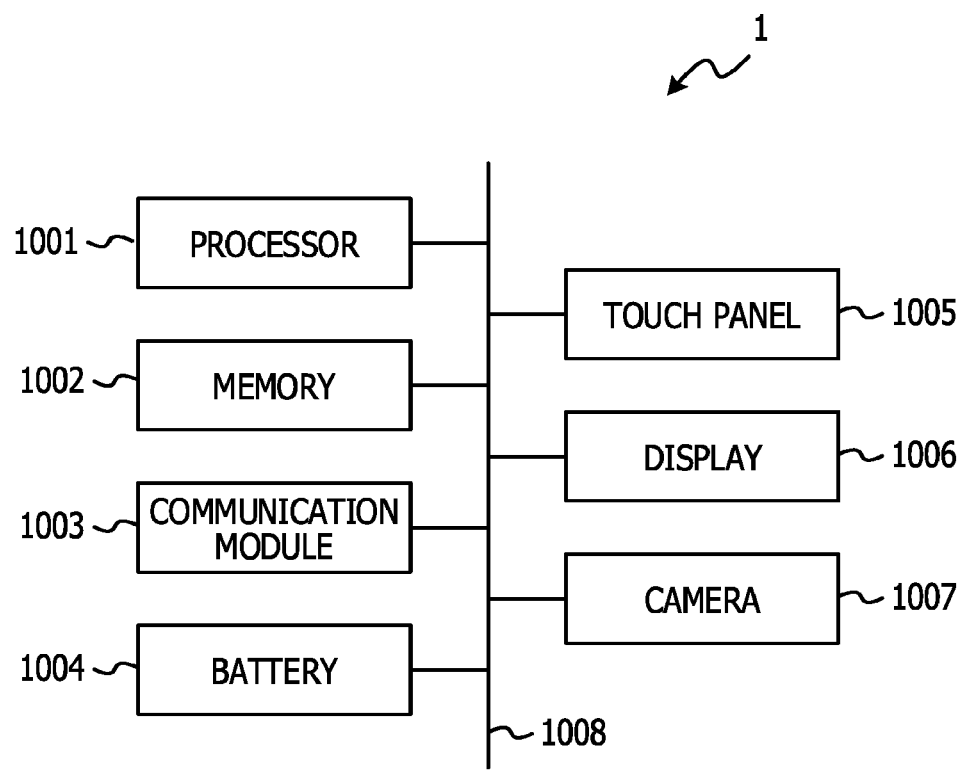
FIG. 17 is an example of the hardware structure of the system.

FIG. 17 is an example of the hardware structure of the system. The system 1 is a computer. The system 1 includes a processor 1001, a memory 1002, a communication module 1003, a battery 1004, a touch panel 1005, a display 1006, and a camera 1007. These units are mutually connected through a bus 1008; under control of the processor 1001, they can mutually transmit and receive data.

A program involved in each embodiment is recorded in a computer-readable recording medium. Computer-readable media include media in magnetic storage devices, optical discs, magneto-optical recording media, and semiconductor memories. Media in magnetic storage devices include media in HDDs, flexible disks (FDs), magnetic tapes (MTs), and the like.

Optical disks include digital versatile discs (DVDs), DVD-RAMs, compact disc-read only memories (CD-ROMs), compact disc-recordables/rewritables (CD-Rs/RWs), and the like. Magneto-optical recording media include magneto-optical disks (MOs) and the like. To place, on the market, a program in which processing in each embodiment is coded, it can be thought that, for example, transportable recording media, such as DVDs and CD-ROMs, in which the program is recorded are sold.

A medium recording device in the computer (system 1) that executes the program in this embodiment reads out the program from the recording medium in which the program is recorded. The processor 1001 stores the read-out program in the memory 1002. The processor 1001 is a central processing unit that controls the entire operations of the system 1.

When the processor 1001 reads out a program in which processing involved in each embodiment is coded from the memory 1002 and executes the program, the processor 1001 functions as the control unit 105 in the system 1. The memory 1002 stores various types of information under control of the processor 1001 and functions as the storage unit 106 in the system 1. The communication module 1003 functions as the communication unit 104 in the system 1 under control of the processor 1001. The battery 1004 supplies electric power to the system 1.

The touch panel 1005 accepts various inputs and functions as the manipulation unit 101 in the system 1. The display 1006 displays various types of information and functions as the display unit 102 in the system 1. The camera 1007 captures images and functions as the photographing unit 103 in the system 1.

Modification 1

Palm authentication described above can also be applied to, for example, devices that have a touch panel display such as ATMs, besides smart phones and tablet computers. In the case of ATMs, processing in this embodiment may be executed on a server side rather than an ATM terminal. That is, images, contact positions, and contact information are sent from the ATM terminal to the server and authentication results and command information are returned from the server.

Modification 2

Although, in the example in FIG. 12, an example in which registered information about only one user is stored has been illustrated, registered information about a plurality of users may be stored as illustrated in, for example, FIG. 18. FIG. 18 is a modification of the data structure of the registered information storage unit. As illustrated in FIG. 18, registered information is stored for each user ID. The form in FIG. 18 is used when, for example, one system is shared by a plurality of users and when processing in this embodiment is executed on the server side as in modification 1.

Modification 3

The authentication method may be one-to-one authentication or may be one-to-N authentication. In the case of one-to-one authentication, registered information items to be compared are reduced to one by inputting a user ID and the like in advance. By contrast, in the case of one-to-N authentication, comparisons are made during authentication between the biometric information created in the above embodiment and a plurality of registered biometric information items.

Modification 4

Contact information can be replaced with information by which a contact range of a finger at a contact position and contact pressure can be inferred. Specifically, the area of a surface in contact, the vertical and horizontal lengths of the surface in contact, a ratio obtained by dividing the length of the area in contact in a direction parallel to the fingertip by a length in a perpendicular direction, or the like may be used instead of a contact range. A contact position and contact information are acquired by an application program interface (API) included in an operating system (OS) in a terminal. If the OS is, for example, Android (registered trademark), a contact position and contact information are acquired by the getSize method in the MotionEvent class and a contact pressure is acquired by the getPressure method. If the OS is Windows (registered trademark), various types of information is acquired by the GetTouchInputInfo function in a desktop application in Windows.

Modification 5

Manipulations that user executes for biometric authentication may be, for example, manipulations in which the user touches touch points, a plurality of times, that are sequentially displayed besides the manipulations to draw a specific shape such as Z. Alternatively, digits 0 to 9 may be displayed on the touch panel display and the user may touch a predetermined digit. In these cases, manipulations to be executed may be guided by a voice or a display before the user executes the manipulations.

Modification 6

The position at which the camera 2 is installed in not limited to the position (the bottom of the system 1 at its center) indicated in FIGS. 1A to 1D and the like. When, for example, the camera 2 installed at the top of the system 1 is used, it is also possible to use the camera 2 in a state in which, for example, the top and bottom of the system 1 are reversed so that at least part of the palm is included in the photography range of the camera 2.

Modification 7

The camera 2 may be an external camera instead of being built into the system 1. Furthermore, the camera 2 may be a near-infrared camera or a visible-light camera. However, an algorithm to create (extract) biometric information varies depending on the camera to be used. When, for example, biometric information is information about veins in the palm and a near-infrared camera is used, an image with veins in the palm highlighted is captured. It suffices for the system 1 to create information about veins in the palm by applying an algorithm disclosed in, for example, David D. Zhang "Palm-print Authentication", Springer, 2004 or the like to the captured image without alteration. By contrast, when biometric information is information about veins in the palm and a visible-light camera is used, an image is captured in which both information about veins in the palm and information about the surface of the palm such as a palm print are included. It suffices for the system 1 to execute preprocessing to highlight veins in the palm according to, for example, the algorithm disclosed in Japanese Patent No. 5509459 or the like and then create information about veins in the palm.

Modification 8

Although biometric information created from each image and the contact position of the finger at the capture of the image have been stored in the registered information storage unit 124 in correspondence to each other, in registration processing, the authenticating unit 114 may create one palm image by combining a plurality of images and may store biometric information created from the combined image as registered information. In this case, in authentication processing, the authenticating unit 114 similarly creates one palm image by combining a plurality of images. Then, authenticating unit 114 may make a comparison between the biometric information created from the combined image of the palm and registered information in consideration of a correspondence relationship of the contact position of the finger.

As the method of creating an image of the entire palm by combining a plurality of images that include mutually different portions on the palm, the method disclosed in Japanese patent application No. 2015-052491, for example, is used. As the method of making a comparison between the biometric information created from the combined image and registered information in consideration of a correspondence relationship of the contact position of the finger as well, the method disclosed in Japanese patent application No. 2015-052491, for example, is used.

Modification 9

Although, in the above embodiment, a type of hand (right or left) to be used and a type of finger to be used have been determined in advance, a plurality of registered information items may be stored for each type of finger and each type of hand (right or left). In this case, types of hands (right and left) and types of fingers are further stored in the registered information storage unit 124. When the user selects a type of hand (right or left) and a type of finger at the time of authentication, registered information to be compared is identified.

Modification 10

The command information storage unit 125 may store a plurality of command information items. Furthermore, the determining unit 115 may determine command information to be output from the plurality of command information items according to a change in contact information.

If, for example, contact information (contact range) indicates a reduction tendency, it can be inferred that the contact range has been narrowed due to a change from a state in which the finger is stretched to a state in which the finger is bent. Therefore, to command the user to move the palm while the angle at which the finger is bent is kept fixed, the determining unit 115 outputs the command information "Please perform manipulations while the angle at which the finger is bent is kept fixed". If the inclination of a function that performs linear approximation on a relationship between a time at which the first acquiring unit 111 acquired contact information and a contact range is equal to or smaller than a threshold, the determining unit 115 decides that the contact range tends to be reduced.

When contact information is a ratio obtained by dividing the length of the area in contact in a direction parallel to the fingertip by a length in a direction perpendicular to the fingertip, if the ratio tends to be lowered, it can be inferred that the user has erected the finger and the position in contact has changed from the pulp of the finger to part of the fingertip. To command the user to perform manipulations with the pulp of the finger without erecting the finger, therefore, the determining unit 115 outputs the command information "Please input while the touched portion of the finger is kept fixed without erecting the finger". If the inclination of a function that performs linear approximation on a relationship between a time at which the first acquiring unit 111 acquired contact information and a ratio is equal to or smaller than a threshold, the determining unit 115 decides that the ratio tends to be reduced.

Modification 11

Command information may be image information or moving picture information, as corresponding to FIGS. 1A to 1D, that illustrate a preferable state, besides text and voice.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a computer for biometric authentication of a manipulating body, the method comprising:
   acquiring, from a touch panel, a set of contact position of the manipulating body and contact information that indicates a degree to which the manipulating body is in contact at the contact position;

acquiring, from a camera, a plurality of images captured while the manipulating body is in contact with a plurality of mutually different positions on the touch panel due to manipulations with the manipulating body;

creating variation information that indicates a variation in the contact information, the variation information being determined based on a plurality sets of the contact information and the contact position during the manipulations with the manipulating body;

determining, prior to the biometric authentication and based on the variation indicated by the variation information, whether a range covered by the plurality of images is sufficient for the biometric authentication, wherein the range is determined to be sufficient for the biometric authentication when the variation is smaller than a threshold, and the range is determined to be insufficient for the biometric authentication when the variation is equal to or greater than the threshold; and outputting command information to a user when the variation indicated by the variation information is equal to or greater than the threshold, the command information commanding the user to manipulate the touch panel again, wherein contents of the command information are to command the user to manipulate the touch panel while moving a whole of the manipulating body in a specific manner predefined to the computer.

2. A system comprising:
circuitry configured to:
acquire, from a touch panel, a contact position of a finger of a user on the touch panel and contact state information about the finger on the touch panel, acquire a plurality of images captured by a camera each time the contact position of the finger changes, the camera being capable of photographing part of a hand of the user while the user is manipulating the touch panel, create at least variation information that indicates a variation in the contact state information about the finger at a capture of the plurality of images, determine, prior to biometric authentication and based on the variation indicated by the variation information, whether a range on the part of the hand covered by the plurality of images is sufficient for creating biometric information of the part of the hand that is used for the biometric authentication of the user, wherein the range is determined to be sufficient for creating the biometric information when the variation is smaller than a threshold, and the range is determined to be insufficient for creating the biometric information when the variation is equal to or greater than the threshold, execute a process for creating the biometric information about the part of the hand based on the plurality of images when the variation is smaller than the threshold, and output command information to the user when the variation indicated by the variation information is equal to or greater than the threshold the command information commanding the user to manipulate the touch panel again, wherein contents of the command information are to command the user to manipulate the touch panel while moving a whole of the hand in a specific manner predefined to the system.

3. The system according to claim 2, wherein
the camera photographs at least part of a palm of the hand, and
the biometric information is biometric information concerning the palm.

4. The system according to claim 2, wherein the contact state information includes at least one of a contact range and a contact pressure while the finger is in contact with each contact position on the touch panel.

5. The system according to claim 2, wherein
the circuitry is configured to execute registration processing for xe biometric information, and
the registration processing is processing to store a first contact position and first biometric information in a memory in correspondence to each other, the first biometric information being extracted from a first image captured while the finger is in contact with the first contact position.

6. The system according to claim 5, wherein
the circuitry is configured to execute authentication processing by using the biometric information, and
the authentication processing is processing to make a comparison between second biometric information extracted from a second image and the first biometric information corresponding to the first contact position that substantially matches a second contact position at a capture of the second image is captured.

7. The system according to claim 2, wherein the threshold is a value that has been preset according to function information that indicates a relationship between a success rate in authentication of a registered user and the variation information.

8. The system according to claim 2, further comprising:
the touch panel; and
the camera.

9. A method executed by a computer, the method comprising:
acquiring, from a touch panel, a contact position of a finger of a user on the touch panel and contact state information about the finger on the touch panel;

acquiring a plurality of images captured by a camera each time the contact position of the finger changes, the camera being capable of photographing part of a hand of the user while the user is manipulating the touch panel;

creating at least variation information that indicates a variation in the contact state information about the finger at a capture of the plurality of images;

determining, prior to biometric authentication and based on the variation indicated by the variation information whether a range on the part of the hand covered by the plurality of images is sufficient for creating biometric information of the part of the hand that is used for the biometric authentication of the user wherein the range is determined to be sufficient for creating the biometric information when the variation is smaller than a threshold, and the range is determined to be insufficient for creating the biometric information when the variation is equal to or greater than the threshold;

executing a process for creating the biometric information about the part of the hand based on the plurality of images when the variation is smaller than the threshold; and outputting command information to the user when the variation indicated by the variation information is equal to or greater than the threshold, the command information commanding the user to manipulate the touch panel again, wherein contents of the command information are to command the user to manipulate the touch panel while moving a whole of the hand in a specific manner predefined to the computer.

10. The method according to claim 9, wherein the camera photographs at least part of a palm of the hand, and the biometric information is biometric information concerning the palm.

11. The method according to claim 9, wherein the contact state information includes at least one of a contact range and a contact pressure while the finger is in contact with each contact position on the touch panel.

12. The method according to claim 9, further comprising:

executing registration processing for the biometric information, and wherein the registration processing is processing to store a first contact position and first biometric information in a memory in correspondence to each other, the first biometric information being extracted from a first image captured while the finger is in contact with the first contact position.

13. The method according to claim 9, further comprising:

executing authentication processing by using the biometric information, and wherein the authentication processing is processing to make a comparison between second biometric information extracted from a second image and the first biometric information corresponding to a first contact position that substantially matches a second contact position at a capture of the second image is captured.

14. The method according to claim 9, wherein the threshold is a value that has been preset according to function information that indicates a relationship between a success rate in authentication of a registered user and the variation information.

* * * * *